United States Patent Office 3,801,712
Patented Apr. 2, 1974

3,801,712
INSECTICIDALLY ACTIVE ACYLATED β,β,β-TRI-CHLORO-α-[3,4-DICHLOROPHENYL]-ETHANOL
Werner Meiser, Wuppertal-Elberfeld, Wolfgang Behrenz, Cologne, and Karl-Heinz Buchel, Wuppertal-Elberfeld, Germany, assignors to Bayer Aktiengesellschaft, Leverkusen, Germany
No Drawing. Filed June 22, 1971, Ser. No. 155,601
Claims priority, application Germany, Mar. 3, 1970, P 21 10 056.1; June 26, 1970, P 20 32 076.7
Int. Cl. A01n 9/24
U.S. Cl. 424—311   5 Claims

ABSTRACT OF THE DISCLOSURE

Compositions and methods of using certain acylated β,β,β - trihalo - α - [3,4-dichlorophenyl]-ethanols of the general formula

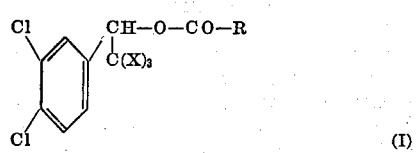

in which:

X is bromine, chlorine or fluorine, and
R is lower alkyl, which possess strong insecticidal properties. Most of the acylated substituted ethanols are new compounds.

The present invention relates to and has for its objects the provision of particular new active compositions in the form of mixtures with solid and liquid dispersible carrier vehicles of certain acylated β,β,β-trihalo-α-[3,4-dichlorophenyl]-ethanols which possess valuable strong insecticidal properties, and methods for using such compounds in a new way for combating and controlling insects with other and further objects becoming apparent from a study of the within specification and accompanying examples.

It is already known that β,β,β-trichloro-α-[3,4-dichlorophenyl]-ethanol exhibits insecticidal properties (R. Riemschneider, Monatshefte für Chemie, vol. 82 (1951), pages 600–606; Swis Patent Specification 251 120). Furthermore, it is known that β,β,β-trichloro-α-(4-chlorophenyl)-ethanol and its acetyl derivative exhibit insecticidal properties (German patent specifications 673,246 and 706,111). These compounds, however, are not particularly effective (cf: Länger, Martin, Müller, Helv, Chim. Aceta, vol 27, page 892(1944)).

It has now been found that the acylated β,β,β-trihalo-α-[3,4-dichlorophenyl]-ethanols of the general formula:

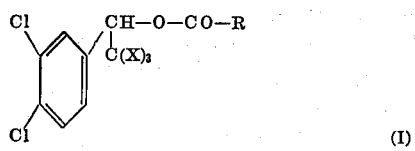

in which:

X is bromine, chlorine or fluorine, and
R is lower alkyl, exhibit excellent insecticidal properties.

The invention therefore provides an insecticidal composition containing as active ingredient a compound of Formula I in admixture with a solid diluent or carrier or in admixture with a liquid diluent or carrier containing a surface-active agent.

The invention also provides a method of combating insects which comprises applying to the insects or a habitat thereof a compound of Formula I alone or in the form of a composition containing as active ingredient a compound of Formula I in admixture with a solid or liquid diluent or carrier.

The invention also provides crops protected from damage by insects by being grown in areas in which, immediately prior to and/or during the time of the growing, a compound of Formula I was applied alone or in admixture with a solid or liquid diluent or carrier. By this means the usual methods of providing harvested crops may be improved.

Surprisingly, the acylated carbinols of the Formula I, especially β,β,β - trichloro - α[3,4-dichlorophenyl]-ethylacetate, compared with the known, non-acylated β,β,β-trichloro-α-chlorophenyl-substituted carbinols and β,β,β-trichloro-α-(4-chlorophenyl)-ethyl acetate, possess a far superior insecticidal effectiveness, especially against flies, mosquitoes and bugs. The effect sets in vary rapidly and is long-lasting.

The compounds can therefore be used with good results for the control of insects, particularly Diptera, their low toxicity to warm-blooded animals being of particular advantage. Thus, tests indicate that β,β,β-trichloro-α-[3,4-dichlorophenyl]-ethyl acetate has a median toxicity value ($LD_{50}$) greater than 2500 mg./kg. rat (oral) Furthermore, the compounds to be used according to the invention, compared with the standard preparation dichlorodiphenyltrichloroethane, possess the advantage of better and more rapid effectiveness as well as higher vapor pressure, so that fewer residue problems result. They can therefore replace DDT which is increasingly losing its importance. The substances to be used according to the invention therefore represent in many respects a genuine enrichment of the art.

As examples of compounds of Formula I to be used according to the invention there are preferred those wherein X is chlorine and R is methyl, ethyl, propyl, isopropyl, butyl, tert.-butyl and 1-ethylpropyl, in particular:

β,β,β-trichloro-α-[3,4 - dichlorophenyl]-ethyl acetate,
β,β,β-trichloro-α-[3,4-dichlorophenyl]-ethyl propionate,
β,β,β-trichloro-α-[3,4-dichlorophenyl]-butyrate,
β,β,β-trichloro-α-[3,4-dichlorophenyl]-ethyl 2-methylpropionate,
β,β,β-trichloro-α-[3,4-dichlorophenyl]-ethyl 2-dimethylpropionate,
β,β,β-tribromo-α-[3,4-dichlorophenyl]-ethyl acetate,
β,β,β-tribromo-α-[3,4-dichlorophenyl]-ethyl propionate,
β,β,β-tribromo-α-[3,4-dichlorophenyl]-ethyl 2-methylpropionate,
β,β,β-tribromo-α-[3,4-dichlorophenyl]-ethyl 2-dimethyl propionate,
β,β,β-trifluoro-α-[3,4-dichlorophenyl]-ethyl acetate,
β,β,β-trifluoro-α-[3,4-dichlorophenyl]-ethyl propionate,
β,β,β-trifluoro-α-[3,4-dichlorophenyl]-ethyl 2-methylpropionate,
β,β,β-trifluoro-α-[3,4-dichlorophenyl]-ethyl 2-dimethylpropionate, and
β,β,β-trichloro-α-[3,4-dichlorophenyl]-ethyl 2-ethylbutyrate.

Of the active compounds which are used according to the invention β,β,β-trichloro-α-[3,4-dichlorophenyl]-ethyl acetate has been prepared by R. Riemschneider, Monatshefte für Chemie, vol. 82, (1951), pp. 600–606. The other compounds of Formula I, however, are new, i.e. those wherein not all X's are chlorine or where R is other than methyl.

These compounds can be prepared according to known processes, especially by acylation of the appropriate carbinols with acid anhydrides or chlorides, possibly in the presence of acid-binding agents or in the presence of catalytic amounts of acid, as for example sulfuric acid. The reaction product may be isolated by destroying the excess acid chloride or anhydride by hydrolysis, separating the aqueous layer and purifying the resulting organic phase by distillation or crystallization.

Preparation of the carbinols to be used as starting materials may be effected either by Friedel-Crafts acylation of the appropriate hdyrocarbons with trihaloacetaldehydes with catalytic assistance of $AlCl_3$, $FeCl_3$, $BF_3$, or concentrated $H_2SO_4$ pursuant to J. W. Howard, J. Amer. Chem. Soc. vol. 57, p. 2317 (1937), T. C. Chen and W. T. Sumerford, J. Amer. Chem. Soc. vol. 72, pp. 5124–5 (1950), or P. Crooy, Ind. Chim. Belge, vol. 32, pp. 268–271 (1967), or according to other processes as disclosed by J. W. Howard and G. N. Stephens, J. Amer. Chem. Soc. vol. 60, p. 228 (1938), R. Riemschneider, Monatschefte für Chemie, vol. 82, pp. 600–606 (1951), or Swiss patent specification 258,755).

As already mentioned, the substances which can be used according to the invention are distinguished by outstanding insecticidal properties. They possess a good effectiveness against both sucking and biting insects, as well as, above all, against Diptera.

The products are therefore used with success in crop protection and the protection of stored products as well as in the hygiene field against the most diverse animal pests.

To the sucking insects contemplated herein there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Machrosiphum solanifolii*), the current gall aphid (*Cryptomyzus korschelti*), the rosy apple aphid (*Sappaphis mali*), the mealy plum aphid (*Hyalopterus arundinis*) and the cherry blackfly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (*Lepidoptera*) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (*Coleoptera*), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montomorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, bactericides and nematocides, or rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marked preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, which comprises applying to at least one of (a) such insects, and (b) the corresponding habitat thereof, i.e. the locus to be protected, a correspondingly combative or toxic amount, i.e. an insecticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples and their tables wherein h. means hours and ′ means minutes.

EXAMPLE 1

$LT_{100}$ test for Diptera:

Test insects: *Musca domestica*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is periodically observed. The time which is necessary for a 100% destruction is determined.

The test insects, the active compounds, the concentrations of the active compounds and the periods of time at which there is a 100% destruction can be seen from the following Table 1.

TABLE 1
($LT_{100}$ test for Diptera)

| Active compound | Concentration of active compound in the solution in percent | $LT_{100}$ |
| --- | --- | --- |
| (A) 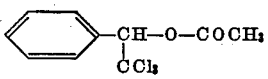 (known). | 0.2 | 8 h.=0% |
| (B) 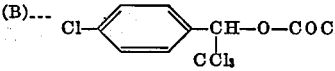 (known). | 0.2 | 8 h.=90% |
| (1) 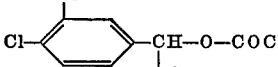 | 0.2<br>0.04<br>0.008 | 30′<br>75′<br>8 h. |
| (2) 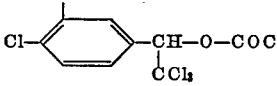 | 0.2<br>0.04 | 75′<br>8 h. |
| (3) 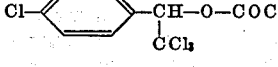 | 0.2<br>0.04<br>0.008 | 75′<br>6 h.<br>8 h.=50% |

EXAMPLE 2

$LT_{100}$ test for Diptera:

Test animals: *Aedes aegypti*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is periodically observed. The time which is necessary for a 100% destruction is determined.

The test insects, the active compounds, the concentrations of the active compounds and the periods of time at which there is a 100% destruction can be seen from the following Table 2.

TABLE 2
($LT_{100}$ test for diptera)

| Active compound | Concentration of active compound in the solution in percent | $LT_{100}$ |
|---|---|---|
| (B)... Cl—⟨⟩—CH—O—COCH₃  \|  CCl₃ (known). | 0.2 <br> 0.04 <br> 0.008 <br> 0.0016 | 15′ <br> 15′ <br> 75′ <br> 4 h.=20% |
| (A)... ⟨⟩—CH—O—COCH₃  \|  CCl₃ (known). | 0.2 | 4 h.=0% |
| (C)... Cl—⟨⟩—C(CCl₃)(H)—⟨⟩—Cl (known). | 0.2 <br> 0.04 <br> 0.008 | 45′ <br> 60′ <br> 4 h.=80% |
| (1).... Cl—⟨⟩(Cl)—CH—O—COCH₃  \|  CCl₃ | 0.2 <br> 0.04 <br> 0.008 <br> 0.0016 | 15′ <br> 15′ <br> 45′ <br> 4 h.=80% |

EXAMPLE 3

$LT_{100}$ test for Diptera:

Test insects: *Anopheles atroparvus*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is periodically observed. The time which is necessary for a 100% destruction is determined.

The test insects, the active compounds, the concentrations of the active compounds and the periods of time at which there is a 100% destruction can be seen from the following Table 3.

TABLE 3
$LT_{100}$ test for Diptera

| Active compound | Concentration of active compound in the solution in percent | $LT_{100}$ |
|---|---|---|
| (C)... Cl—⟨⟩—C(CCl₃)(H)—⟨⟩—Cl (known). | 0.2 <br> 0.04 <br> 0.008 | 60′ <br> 60′ <br> 90′ |
| (A)... ⟨⟩—CH—O—CO—CH₃  \|  CCl₃ (known). | 0.2 | 105′ |
| (1).... Cl—⟨⟩(Cl)—CH—O—CO—CH₃  \|  CCl₃ | 0.2 <br> 0.04 <br> 0.008 | 15′ <br> 30′ <br> 45′ |
| (2).... Cl—⟨⟩(Cl)—CH—O—COC₂H₅  \|  CCl₃ | 0.2 <br> 0.04 <br> 0.008 | 15′ <br> 30′ <br> 75′ |

The following further examples are set forth to illustrate, without limitation, the process for producing the active compounds according to the present invention.

EXAMPLE 4

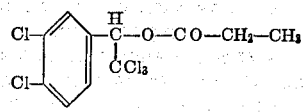

(2)

150 ml. of propionic anhydride are added to 147 g. of β,β,β-trichloro-α-[3,4-dichlorophenyl]-ethanol in 100 ml. of glacial acetic acid, and to this mixture 102 g. of concentrated sulfuric acid are added dropwise at 80° C. The reaction mixture is then heated on a water-bath for an hour; after cooling, it is poured into ice water; one hour later, it is taken up in methylene chloride and the organic phase is dried. After the solvent has been distilled off, there is obtained by distillation 115 g. of the propionate of β,β,β-trichloro-α-[3,4-dichlorophenyl[-ethanol of B.P. 144–148° C./0.5 mm. Hg.

EXAMPLE 5

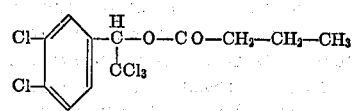

(3)

118 g. of butyric anhydride are added to 94 g. of β,β,β-trichloro-α-[3,4-dichlorophenyl]-ethanol in 65 ml. of glacial acetic acid, and to this mixture 65 g. of concentrated sulfuric acid are added dropwise at about 80° C. The mixture is then heated on a water-bath for an hour; after pouring into 1 liter of ice water, it is extracted with methylene chloride one hour later and the organic layer is dried. The solvent is evaporated under reduced pressure, the residue is distilled, and the butyrate of β,β,β-trichloro-α-[3,4-dichlorophenyl]-ethanol is obtained in an amount of 95 g. with the B.P. 145° C./0.4 mm. Hg.

The compounds of Formula I whose substituents are listed in the following table can be obtained in a manner analogous to that of the above examples.

| Compound | X | R | B.P. [° C.] at mm. Hg |
|---|---|---|---|
| (4) | F | —CH₃ | 120/0.3 |
| (5) | Br | —CH₃ | 160/0.3 |
| (6) | Cl | —CH(CH₃)₂ | 145/0.5 |
| (7) | Cl | —C(CH₃)₃ | 150/0.4 |
| (8) | Cl | —CH(CH₂—CH₃)₂ | 142/0.2 |

It will be appreciated that the instant specification and examples are set forth by way of illustration and not limitation, and that various modifications and changes may be made without departing from the spirit and scope of the present invention.

What is claimed is:

1. The method of controlling insects which comprises applying to said insects or their habitat an insecticidally effective amount of an acylated ethanol of the formula

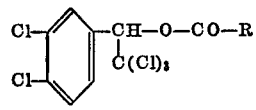

(I)

in which R is methyl, ethyl, propyl, isopropyl, butyl, tertiary butyl or 1-ethylpropyl.

2. The method of claim 1 wherein such insects are Diptera.

3. The method of claim 1 wherein such acylated ethanol is β,β,β-trichloro-α-[3,4-dichlorophenyl]-ethyl acetate of the formula

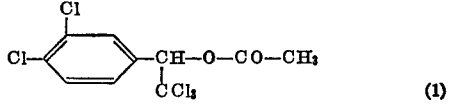

(1)

4. The method of claim 1 wherein such acylated ethanol is β,β,β-trichloro-α-[3,4-dichlorophenyl]-ethyl propionate of the formula

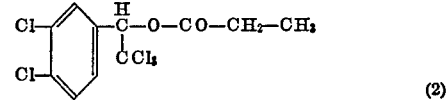

(2)

5. The method of claim 1 wherein such acylated ethanol is β,β,β-trichloro-α-[3,4-dichlorophenyl]-ethyl butyrate of the formula

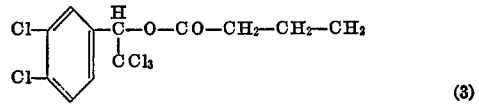

(3)

References Cited

UNITED STATES PATENTS

| | | | |
|---|---|---|---|
| 2,508,335 | 5/1950 | Moyle et al. | 424—311 |
| 2,861,097 | 11/1958 | Senkbeil et al. | 71—106 X |

FOREIGN PATENTS

| | | |
|---|---|---|
| 673,246 | 3/1939 | Germany. |
| 706,111 | 1/1952 | Germany. |

OTHER REFERENCES

Chemical Abstracts, vol. 43, item 7959i, 1949.
J. Amer. Soc., vol. 72, pp. 5124–24, November 1950.
J. Amer. Chem. Soc., vol. 77, pp. 5410–11, October 1955.

ALBERT T. MEYERS, Primary Examiner
D. W. ROBINSON, Assistant Examiner

U.S. Cl. X.R.
260—488 CD

UNITED STATES PATENT OFFICE
CERTIFICATE OF CORRECTION

Patent No. 3,801,712     Dated April 2, 1974

Inventor(s) WERNER MEISER ET AL

It is certified that error appears in the above-identified patent and that said Letters Patent are hereby corrected as shown below:

Col. 1, line 8 (Priority Claim), change "Mar. 3, 1970" to -- Mar. 3, 1971 --.

Col. 1, line 48, correct spelling of "Swiss".

Col. 2, line 49, before "butyrate" insert -- ethyl --.

Col. 3, line 41, correct spelling of "Macrosiphum".

Col. 3, line 42, correct spelling of "currant".

Col. 3, line 65, correct spelling of "tortrix".

Signed and sealed this 22nd day of October 1974.

(SEAL)
Attest:

McCOY M. GIBSON JR.
Attesting Officer

C. MARSHALL DANN
Commissioner of Patents